(12) United States Patent
Beyer et al.

(10) Patent No.: US 12,503,565 B2
(45) Date of Patent: Dec. 23, 2025

(54) SELECTIVE DEPOLYMERISATION OF POLYAMIDE 6 TO PRODUCE CAPROLACTAM FROM MIXTURES OF CAPROLACTAM-CONTAINING POLYMERS AND POLYURETHANE-CONTAINING POLYMERS, IN PARTICULAR POLYURETHANE BLOCK COPOLYMERS

(71) Applicant: BASF SE, Ludwigshafen am Rhein (DE)

(72) Inventors: Caroline Beyer, Ludwigshafen am Rhein (DE); Florian Richter, Ludwigshafen am Rhein (DE)

(73) Assignee: BASF SE, Ludwigshafen am Rhein (DE)

( * ) Notice: Subject to any disclaimer, the term of this patent is extended or adjusted under 35 U.S.C. 154(b) by 373 days.

(21) Appl. No.: 18/265,702

(22) PCT Filed: Dec. 14, 2021

(86) PCT No.: PCT/EP2021/085651
§ 371 (c)(1),
(2) Date: Jun. 7, 2023

(87) PCT Pub. No.: WO2022/129022
PCT Pub. Date: Jun. 23, 2022

(65) Prior Publication Data
US 2024/0117142 A1    Apr. 11, 2024

(30) Foreign Application Priority Data
Dec. 17, 2020  (EP) .................................... 20215074

(51) Int. Cl.
C08J 11/16      (2006.01)
C07D 223/10     (2006.01)

(52) U.S. Cl.
CPC ............. *C08J 11/16* (2013.01); *C07D 223/10* (2013.01); *C08J 2375/04* (2013.01); *C08J 2377/02* (2013.01); *Y02W 30/62* (2015.05)

(58) Field of Classification Search
CPC ...... C07D 223/10; C08J 11/16; C08J 2377/02
See application file for complete search history.

(56) References Cited

U.S. PATENT DOCUMENTS

| | | | |
|---|---|---|---|
| 4,973,647 A | 11/1990 | Bretches et al. | |
| 5,000,899 A | 3/1991 | Dreibelbis et al. | |
| 5,233,021 A | 8/1993 | Sikorski | |
| 5,700,358 A | 12/1997 | Fuchs et al. | |
| 6,639,041 B2 | 10/2003 | Nishikawa et al. | |
| 2003/0088049 A1 | 5/2003 | DeGuia | |

FOREIGN PATENT DOCUMENTS

| | | |
|---|---|---|
| CA | 1076743 A | 4/1980 |
| CN | 103467378 A | 12/2013 |
| DE | 1495198 A1 | 2/1969 |
| DE | 2558480 A1 | 7/1977 |
| EP | 0343985 A2 | 11/1989 |
| EP | 0670308 A1 | 9/1995 |
| GB | 1113357 A | 5/1968 |
| JP | 08-048666 A | 2/1996 |
| JP | 08-217746 A | 8/1996 |
| JP | 2008-179816 A | 8/2008 |
| JP | 2011-088943 A | 5/2011 |
| WO | 93/25736 A1 | 12/1993 |
| WO | 96/18612 A1 | 6/1996 |
| WO | 96/18613 A1 | 6/1996 |
| WO | 96/18614 A1 | 6/1996 |
| WO | 2003/010216 A1 | 2/2003 |
| WO | 2013/032408 A1 | 3/2013 |

OTHER PUBLICATIONS

Database WPI, Week 201417, Thomson Scientific, London, GB, AN 2014-D51629, XP002803339, 2017, 2 pages.
European Search Report for EP Patent Application No. 20215074.4, Issued on Jul. 19, 2021, 3 pages.
Harini Bhuvaneswari. G, "Chapter: 3 Degradability of Polymers", Recycling of Polyurethane Foams, ed. Thomas, et al., 1st Edition, Jun. 6, 2018, pp. 33-43.
LV, et al., "Recycling of waste nylon 6/spandex blended fabrics by melt processing", Composites Part B: Engineering, vol. 77, Aug. 2015, pp. 232-237.
Pashaei, et al., "Thermal degradation kinetics of nylon6/GF/crysnano nanoclay nanocomposites by TGA", Chemical Industry and Chemical Engineering Quarterly/CICEQ, vol. 17, Issue 2, 2011, pp. 141-151.
International Preliminary Report on Patentability received for PCT Patent Application No. PCT/EP2021/085651, mailed on Jun. 29, 2023, 13 pages (6 pages of English Translation and 7 pages of Original Document).
International Search Report and Written Opinion received for PCT Patent Application No. PCT/EP2021/085651, mailed on May 9, 2022, 12 pages (2 pages of English Translation and 10 pages of Original Document).

*Primary Examiner* — James Sanders
(74) *Attorney, Agent, or Firm* — Faegre Drinker Biddle & Reath LLP

(57) ABSTRACT

A process for obtaining caprolactam from mixtures of caprolactam-containing polymers and polyurethane-containing polymers, in particular polyurethane block copolymers, by depolymerization, wherein the depolymerization of the mixture is performed in the presence of 0.05% to 5% by weight of a base at a temperature of 250° C. to 350° C. and a pressure of 5 to 700 mbar and wherein the caprolactam is obtained in gaseous form.

10 Claims, No Drawings

SELECTIVE DEPOLYMERISATION OF POLYAMIDE 6 TO PRODUCE CAPROLACTAM FROM MIXTURES OF CAPROLACTAM-CONTAINING POLYMERS AND POLYURETHANE-CONTAINING POLYMERS, IN PARTICULAR POLYURETHANE BLOCK COPOLYMERS

CROSS-REFERENCE TO RELATED APPLICATIONS

This application is a National stage application (under 35 U.S.C. § 371) of PCT/EP2021/085651, filed Dec. 14, 2021, which claims benefit of European Application No. 20215074.4, filed Dec. 17, 2020, both of which are incorporated herein by reference in their entirety.

The present invention relates to a process for obtaining caprolactam from mixtures of caprolactam-containing polymers and polyurethane-containing polymers, in particular polyurethane block copolymers, in particular spandex, by depolymerization.

The recovery of caprolactam from caprolactam-containing polymers is an important economic concern, especially against the background of ever scarcer resources.

Thus for example U.S. Pat. No. 5,233,021 discloses a recycling process of polymeric material from carpets and other multicomponent structures by supercritical fluid extraction.

Also, polymer wastes composed of polyamide (nylon 6) are cleaved in a process under high pressure and using superheated steam and acid (WO 96/18613).

Caprolactam is also obtainable from mixtures comprising polymeric or thermoplastic molding materials by depolymerization at elevated temperatures in the presence of a base under reduced pressure or in the presence of water (WO 96/18614).

WO96/18612 discloses a process for basic depolymerization of polyamide-containing starting materials under reduced pressure. The resulting caprolactam is withdrawn from the process via the vacuum and sent for further use.

None of these processes employ materials comprising caprolactam-containing polymers and polyurethane-containing polymers.

However, textile recycling is an important issue in the recycling industry and is focusing the attention of textile manufacturers to reduce the immense resources required for textile production.

Fabrics comprising polyamide fibers (usually caprolactam-containing polymers (PA6)) and polyurethane-containing polymers, in particular polyurethane block copolymers such as for example spandex, are employed in many garments and industrial applications to improve product properties.

To produce the polyurethane block copolymers simple linear polyurethanes are formed for example by the diisocyanate polyaddition process. The production of a polyurethane from butylene glycol and hexamethylene diisocyanate for example is well-suited for fiber production. To form the elastomeric polyurethane block copolymer, a segmented polyurethane, a large part of the glycol is replaced by long-chain polyether- or polyester-based dihydroxy compounds (macrodiols) having terminal OH groups in the polyaddition reaction.

Fabrics made of polyamide fibers (preferably polyamide 6) and polyurethane block copolymers can generally vary in the content of spandex relative to the polyamide fiber content. Typical contents are 5-25% by weight of spandex and 95-75% by weight of polyamide.

Since polyurethane-containing polymers, particularly spandex, and polyamide polymers have very different chemical properties and production techniques, the fabrics and garments comprising both polymers are very difficult to recycle in an economical and environmentally acceptable manner.

The depolymerization in the process disclosed in WO96/18612 for example is performed at temperatures at which polyurethanes show thermal instability. The use of PU (polyurethane)-containing polymers with polyamides, for example PA6 (polyamide 6)/spandex (polyurethane block copolymer) fibers, mixtures of PA6 fibers and spandex fibers or else PA6 fibers coated with polyurethane-containing polymers, in this process can cause the obtained caprolactam to become contaminated since the PU (polyurethane) decomposes under the process conditions and the decomposition products are likewise withdrawn via the vacuum.

Many known processes are therefore based on the use of solvents for separating polyurethane-containing polymers, for example spandex fibers, or polyamide fibers from fabrics and garments.

To dissolve spandex from an elastomeric fabric, strong polar solvents such as dimethylacetamide (DMAc) or dimethylformamide (DMF) for example are used. They dissolve spandex, leaving behind the polyamide undissolved for separate recycling. Formic acid and sulfuric acid in turn can dissolve the polyamide and thus separate spandex for recycling.

Gong et al. (Textile Research Journal 0(00) 1-10) examined for example the recycling of PA6 and polyurethane (PU) from mixed PA6/PU wastes. A solvent (DMF) was employed to selectively dissolve the polyurethane. Filtration afforded pure PA6 which can subsequently be sent for recycling after further purification steps.

The recycling of PA6/spandex wastes was also described by Wang et al. (Composites Part B 77 (2015) 232-237). In the disclosed process the spandex was removed by washing with a solvent at high temperatures before the PA6 can be recycled.

WO 2013/032408 discloses a process for recycling polyamide from elastic fibers comprising PA6 and spandex. The multi-stage process consists of a controlled thermal decomposition of the spandex proportion which, in a subsequent step, is then dissolved by a suitable solvent (for example ethanol, DMAc, DMF). Separation of the solvent makes it possible to obtain polyamide which may be sent for recycling in a further step.

However, common to all known processes is that a costly and complex separation of the polyamide and polyurethane compounds must be performed before the polycaprolactone (PA 6) can be recycled. In addition, a great disadvantage of these solvent-based separation processes is the amount of the solvent required and environmental problems potentially resulting therefrom.

It is accordingly an object of the present invention to provide a process for obtaining caprolactam from mixtures of caprolactam-containing polymers and polyurethane-containing polymers, in particular polyurethane block copolymers, for example spandex, which does not have the above-mentioned disadvantages and allows direct selective separation of caprolactam from these mixtures comprising polyurethane-containing polymers without prior separation of the mixtures.

It is especially an object of the present invention to provide a process which entirely avoids solvent-based separation processes.

This object has now been achieved by a process for obtaining caprolactam from mixtures of caprolactam-containing polymers and polyurethane-containing polymers by depolymerization of the mixture in the presence of 0.05% to 5% by weight of a base at a temperature of 250° C. to 350° C. and a pressure of 5 to 700 mbar, wherein the caprolactam is obtained in gaseous form.

The object has further been achieved by a process for obtaining caprolactam from a mixture of caprolactam-containing polymers with polyurethane-containing polymers by depolymerization, comprising the steps of:

(A) heating the mixture to a temperature of 220° C. to 300° C. to obtain a melt, (B) adding a base before, during or after step (A), (C) charging the melt into at least one depolymerization reactor, (D) heating the mixture to a temperature of 250° C. to 350° C. to obtain gaseous caprolactam, (E) discharging the gaseous caprolactam from the depolymerization reactor to leave behind a residue.

The process is preferably performed at a pressure of 5 to 700 mbar.

It has surprisingly been found that the process according to the invention makes it possible to selectively depolymerize PA6 from a mixture comprising polyamide 6 and polyurethane-containing polymers—in particular spandex (polyurethane block copolymers). The resulting caprolactam is separated via the vacuum and is contaminated only to a small extent, if at all, by decomposition products of polyurethane (PU). To a small extent is to be understood as meaning that the resulting caprolactam comprises 0% to 5% by weight of decomposition products of polyurethane (PU), preferably 0% to 3.5% by weight, particularly preferably 0% to 3% by weight, very particularly preferably 0% to 1% by weight, of decomposition products of polyurethane (PU).

Definitions

Spandex: The term "spandex" or "elastane" refers to an elastomeric polyurethane block copolymer comprising at least 85% by weight of segmented polyurethanes based on polyethers, polyesters and/or polycarbonates. Spandex is a segmented polymer that exhibits superior stretch and elastic resilience through alternating stiff and flexible segments. The urethane forms stiff, stretched sections that attach longitudinally to one another and ensure the cohesion of the fibers through establishment of secondary bonding forces. By contrast, rubber-like polyalcohols blocks (about 40 to 50 monomer units each) are severely balled up but may easily be stretched. This combination of stiff and elastic blocks achieves exceptionally high extensibility. Spandex is used very widely and is sold as an elastomeric fiber under that name or under the names elastane (preferred in Europe) or under trade names, such as Lycra (Invista) and ELASPAN (Invista). Typical examples of spandex fibers are described for example in U.S. Pat. No. 4,973,647, EP 0343985, U.S. Pat. No. 6,639,041 (all du Pont) and WO03/010216.

As used herein, the term "elastomeric fabric" refers to any desired fabric containing different sections of spandex fibers and different sections of other synthetic fibers and the term "elastomeric garments" relates to any government which contains different sections of spandex fibers and different sections of other synthetic fibers.

The term "polyamide fibers" refers to polyamide fibers, in particular polyamide 6 (PA6, polycaprolactam), copolymers, any desired combination thereof or any desired combination thereof with other polyamides.

The term "block copolymer" refers to copolymers made up of at least two different comonomers A and B, wherein these are in the form of longer sequences or blocks (for example—AAAAAAAAABBBBBBBBBBBB-).

A polyurethane block copolymer according to the present invention has a mass fraction of at least 85% polyurethane.

"Polyurethane-containing polymers" in the context of the present invention refers to polyurethane copolymers (copolymers) and/or polyurethane block copolymers (copolymers with (segmented) polyurethanes), wherein polyurethane block copolymers are particularly preferred.

In contrast to polyamides, in particular PA6 (polyamide 6), spandex has a markedly lower heat stability. "Recycling of Polyurethane Foams 2018, page 33" discloses the heat stability of polyurethanes at different temperatures. Decomposition of the PU segments commences at temperatures as low as between 200-250° C. Polyamides show no thermal decomposition in these temperature ranges (Pashaei et al.; Chemical Industry and Chemical Engineering Quarterly 17(2):141-151).

Despite the low heat stability of spandex fibers the process according to the invention makes it possible to selectively obtain caprolactam from mixtures comprising polyurethane-containing polymers, in particular polyurethane block copolymers.

According to the invention caprolactam is obtained from mixtures of caprolactam-containing polymers and polyurethane-containing polymers by depolymerization, wherein the depolymerization of the mixture is performed in the presence of 0.05% to 5% by weight of a base, based on the amount of caprolactam-containing polymers, at a temperature of 250° C. to 350° C. and a pressure of 5 to 700 mbar and wherein the caprolactam is obtained in gaseous form.

The mixtures comprise 75% to 99.9% by weight of caprolactam-containing polymers and 0.1% to 25% by weight of polyurethane-containing polymers, preferably 75% to 98% by weight, of caprolactam-containing polymers and 2% to 25% by weight of polyurethane-containing polymers, particularly preferably 75% to 95% by weight of caprolactam-containing polymers and 5% to 25% by weight of polyurethane-containing polymers, very particularly preferably 80-95% by weight of caprolactam-containing polymers and 5% to 20% by weight of polyurethane-containing polymers, especially preferably 80% to 98% by weight of caprolactam-containing polymers and 2% to 20% by weight of polyurethane-containing polymers, based on the mass of caprolactam-containing polymers and polyurethane-containing polymers in the mixture.

All economically relevant polycaprolactams may be converted into caprolactam by the process according to the invention, for example also polycaprolactams produced in the presence of mono- or dicarboxylic acids or amines acting as chain regulators, such as acetic acid, propionic acid, benzoic acid, C4-C10-alkanedicarboxylic acids such as adipic acid, pimelic acid, suberic acid, azelaic acid, sebacic acid, undecanedioic acid, dodecanedioic acid and mixtures thereof, C5-C8-cycloalkanedicarboxylic acids such as cyclopentane-1,3-dicarboxylic acid, cyclohexane-1,4-dicarboxylic acid and mixtures thereof, benzenedicarboxylic and naphthalenedicarboxylic acids which may bear up to two sulfonic acid groups, wherein this is to be understood as also including the corresponding alkali metal salts, and whose carboxylic acid groups are nonadjacent, such as terephthalic acid, isophthalic acid, naphthalene-2,6-dicarboxylic acid, 5-sulphoisophthalic acid and the sodium and lithium salts thereof, and mixtures thereof, and 1,4-piperazine-di(C1-C6-alkanedicarboxylic acids) such as 1,4-piperazinediacetic acid, 1,4-piperazinedipropionic acid, 1,4-piperazinedibutanoic acid, 1,4-piperazinedipentanoic acid, 1,4-piperazinedihexanoic acid.

Corresponding copolyamides are known to those skilled in the art and are producible by processes described for example in WO 93/25736, DE-A 14 95 198 and DE-A 25 58 480.

The depolymerization is particularly preferably performed in the presence of 0.05% to 3% by weight of a base, based on the amount of caprolactam-containing polymers.

It is very particularly preferably performed in the presence of 0.6% to 2.8% by weight of a base, based on the amount of caprolactam-containing polymers.

According to the invention the base employed is selected from the group consisting of alkali metal oxide, alkali metal hydroxide, alkali metal carbonate, alkali metal alkoxide, alkaline earth metal oxide, alkali metal hydroxide and alkaline earth metal carbonate, such as sodium oxide, potassium oxide, magnesium oxide, calcium oxide, sodium hydroxide, potassium hydroxide, calcium hydroxide, sodium carbonate, potassium carbonate, sodium methoxide, calcium carbonate and magnesium carbonate.

The base is particularly preferably a compound selected from the group of: alkali metal oxide, alkali metal hydroxide, alkali metal carbonate, preferably potassium hydroxide.

According to the invention the depolymerization is carried out in at least one depolymerization reactor, preferably in precisely one depolymerization reactor.

In the context of the present invention a depolymerization reactor is to be understood as meaning a horizontal or vertical depolymerization reactor having a mixing and/or conveying means, for example a screw conveyor which is provided along the longitudinal axis of the reactor in its interior, for example a kneader reactor or a stirred tank reactor, wherein a horizontal kneader reactor is particularly preferred.

According to the invention there may be precisely one depolymerization reactor but it may also be preferable to use at least two depolymerization reactors one behind the other (in series). It may also be preferable to use at least 2 depolymerization reactors in parallel.

In the case of the at least 2 reactors the resulting caprolactam is preferably combined.

In the present invention it is particularly preferable when the water content of the mixture during the depolymerization is not more than 5% by weight, preferably not more than 1% by weight, particularly preferably not more than 0.3% by weight, based on the total mixture.

The depolymerization by the process according to the invention is preferably performed at a temperature of 270° C. to 350° C. The depolymerization is particularly preferably performed at a temperature of 280° C. to 320° C. The depolymerization is performed at a pressure of 5 to 700 mbar, preferably 8 to 200 mbar, particularly preferably at a pressure of 10 to 100 mbar.

The residence time in each of the depolymerization reactors is 10 to 300 minutes, preferably from 20 to 200 minutes, in the case of a continuous process.

In a further particularly preferred embodiment the process for obtaining caprolactam from a mixture of caprolactam-containing polymers with polyurethane-containing polymers, in particular polyurethane block copolymers, by depolymerization comprises the steps of:

(A) heating the mixture to a temperature of 220° C. to 300° C. to obtain a melt (S),
(B) adding a base before, during or after step (A),
(C) charging the melt (S) into at least one depolymerization reactor,
(D) heating the melt (S) to a temperature of 250° C. to 350° C. to obtain gaseous caprolactam (C),
(E) discharging the gaseous caprolactam (C) from the depolymerization reactor to leave behind a residue.

The corresponding mixture to be depolymerized may be melted in conventional melting apparatuses. This is preferably done in an extruder at a temperature of 220° C. to 300° C., preferably of 230° C. to 290° C., to obtain the melt (S). The extruder is, for example, a compounding extruder for plastics processing, preferably a twin-screw extruder.

In a preferred embodiment the base is supplied to the melt (S) during step (A). This is preferably done in the extruder. Addition in the depolymerization reactor is also possible.

In a further preferred embodiment the water present is removed from the melt (S) before the depolymerization by subjecting the melt (S) to a reduced pressure of 5 to 700 mbar, preferably 8 to 200 mbar, particularly preferably 10 to 100 mbar.

This may be done in the extruder and/or the depolymerization reactor.

The melt (S) is brought to a temperature of 250° C. to 350° C., preferably a temperature of 270° C. to 350° C., in at least one depolymerization reactor. Depolymerization at a temperature of 280° C. to 320° C. is particularly preferred.

The depolymerization is performed at a pressure of 5 to 700 mbar, preferably 8 to 200 mbar, particularly preferably at a pressure of 10 to 100 mbar.

The water content of the melt (S) during the depolymerization is not more than 5% by weight, preferably not more than 0.3% by weight, particularly preferably not more than 0.01% by weight, based on the total mixture.

The obtained caprolactam is generally continuously discharged from the at least one depolymerization reactor. When using more than one depolymerization reactor the resulting caprolactam is preferably combined from all reactors.

The purification of the caprolactam obtained according to the invention may be performed by a conventional process. Examples of purification processes include for example an acidic or basic distillation such as disclosed in EP0670308 for example.

The caprolactam obtained by the process according to the invention has a high purity of 85% to 100% by weight, preferably of 90% to 100% by weight, especially preferably 95% to 100% by weight and particularly preferably of 97% to 100% by weight. The caprolactam obtained by the process according to the invention generally has a purity of 90% to 95% by weight.

The caprolactam obtained by the process according to the invention comprises 0% to 5% by weight of decomposition products of polyurethane (PU), preferably 0% to 3.5% by weight, particularly preferably 0% to 3% by weight, very particularly preferably 0% to 1% by weight.

The caprolactam obtained by the process according to the invention may be reused for producing polycaprolactam or corresponding copolymers and polymer mixtures.

This polycaprolactam produced from caprolactam obtained by the process according to the invention or corresponding copolymers and polymer mixtures are advantageously suitable for use for automotive applications and for producing moldings for electrical and electronic components, especially also in the high-temperature range.

A specific embodiment is that of shaped articles in the form of or as part of a component part for the automotive sector, especially selected from cylinder head covers, engine covers, housings for charge air coolers, charge air cooler valves, intake pipes, intake manifolds, connectors, gears, fan impellers, cooling water tanks, housings or housing parts for heat exchangers, coolant coolers, charge air coolers, thermostats, water pumps, heating elements, securing parts or as a constituent of battery systems for electromobility.

Possible uses in automobile interiors are for dashboards, steering-column switches, seat components, headrests, center consoles, gearbox components and door modules, and possible uses in automobile exteriors are for A, B, C, or D pillar covers, spoilers, door handles, exterior mirror components, windshield wiper components, windshield wiper protective housings, decorative grilles, cover strips, roof rails, window frames, sunroof frames, antenna covers, front and rear lights, engine hoods, cylinder head covers, intake pipes, windshield wipers, and exterior bodywork parts.

A further specific embodiment is that of shaped bodies as such or as part of an electrical or electronic passive or active component, of a printed circuit board, of part of a printed circuit board, of a housing constituent, of a film, or of a wire, more particularly in the form of or as part of a switch, of a plug, of a bushing, of a distributor, of a relay, of a resistor, of a capacitor, of a winding or of a winding body, of a lamp, of a diode, of an LED, of a transistor, of a connector, of a regulator, of an integrated circuit (IC), of a processor, of a controller, of a memory element and/or of a sensor.

This polycaprolactam or corresponding copolymers and polymer mixtures are further especially suitable for use in lead free soldering, for production of plug connectors, microswitches, micro-buttons and semiconductor components, especially reflector housings of light-emitting diodes (LEDs).

A specific embodiment is that of shaped articles as securing elements for electrical or electronic components, such as spacers, bolts, fillets, push-in guides, screws and nuts.

Especially preferred is a molding in the form of or as part of a socket, of a plug connector, of a plug or of a bushing. The molding preferably includes functional elements which require mechanical toughness. Examples of such functional elements are film hinges, snap-in hooks and spring tongues.

Possible uses of the polyamides of the invention for the kitchen and household sector are for production of components for kitchen machines, for example fryers, clothes irons, knobs, and also applications in the garden and leisure sector, for example components for irrigation systems or garden equipment and door handles.

This polycaprolactam or corresponding copolymers and polymer mixtures produced from the caprolactam obtained by the process according to the invention are moreover advantageously suitable for use in injection molding and extrusion applications, for example in the field of film extrusion and fiber and monofilament production. In the packaging sector the polyamides according to the invention may be employed for example in monolayer or multilayer blown films, cast films (mono- or multilayer), biaxially stretched films (BoPA), laminated films or in extrusion coatings. Typical fields of application are in the field of foodstuffs packaging as packaging films, bags or lidding films, for example for packaging meat, poultry, seafood, cheese or coffee. Other preferred fields of application are in medical packaging for packaging syringes and surgical instruments for example, in containers for packaging cosmetics or in multilayer containers for solvent-containing products such as paints, coatings or plant protection products. Further possible applications in the field of film extrusion may be found in agricultural films, VARTM films, bubble wrap or general technical films.

This polycaprolactam or corresponding copolymers and polymer mixtures are also preferentially suitable for producing monofilaments used in fishing lines, fishing nets, offshore fishing lines and ropes. For the possible applications of monofilaments include inter alia tennis strings, climbing ropes, bristles and brushes, artificial grass, filaments for 3D printing, grass trimmers, zippers, hook-and-loop fasteners and paper machine clothing.

In the field of fiber production this polycaprolactam or corresponding copolymers and polymer blends are preferentially suitable for producing industrial fibers, textile fibers or BCF yarns (carpet fibers). The applications include inter alia fibers for production of airbags, ropes, tire cords, textiles, tights, jackets, trousers, carpets, etc.

Further suitable applications include the extrusion of semifinished products and thus the production of rods, sheets and pipes, from which a series of further components may be fabricated. These include inter alia sliding elements, spindle nuts, chain conveyors, plain bearings, rollers, wheels, transmissions, gears, rolls, ring gears, screws and spring dampers.

Other possible applications include for example pipes, hoses, pipe conduits, cable sheathings, sockets, switches, cable ties, fan wheels etc.

The process according to the invention accordingly allows recycling of textiles consisting both polyamide 6 and polyurethane-containing polymers, in particular spandex, in just a few steps without preceding separation of the components. The process according to the invention avows selective polyamide 6 depolymerization to afford caprolactam in the presence of polyurethane-containing polymers such as in particular spandex without costly pretreatment to separate the polymers. The obtained caprolactam also has a high purity.

Methods

GC Method for Purity Determination of Caprolactam

| | |
|---|---|
| Stationary phase | ZB SHT Inferno |
| Manufacturer | Phenomenex |
| Length [m] | 30 |
| Internal diameter [mm] | 0.32 |
| Film thickness [μm] | 0.25 |
| Carrier gas | Hydrogen |
| Makeup gas | Nitrogen |
| Split | 5 |
| Inlet temperature [° C.] | 250 |
| Gas pressure [PSI] | 14 |
| Oven temperature: | 140° C. for 15.5 min, then heat to 220° C. at a gradient of 60° C./min, 0 min hold time. |

Dimethyl adipate (Sigma Aldrich, >99%) is used as internal standard for quantification of caprolactam. A calibration series with pure caprolactam (BASF pure lactam, 99%) was also prepared.

Sample Preparation:

20 mg of internal standard (dimethyl adipate, Sigma Aldrich, >99%) and 0.1-0.6 g of caprolactam are dissolved in 3-6 ml of isopropanol (Fisher Scientific, >99.8%). The solution is diluted 1:1 with acetone (BASF, pure) and left to stand at room temperature for 30 min. The sample is subsequently measured.

EXAMPLES

Example 1 (According to the Invention)

Depolymerization of a PA6 (Polyamide 6)/Polyurethane Block Copolymer Mixture:

An 80:20 PA6/polyurethane block copolymer mixture (textile from INDITEX/Nextil) (402 g) was admixed with 2% KOH (Bernd Kraft, ultrapure potassium hydroxide pellets) (8 g) and melted in a TCF 2.5 twin-screw kneader (LIST Technology AG, Switzerland). A vacuum of 80-100 mbar abs. was then established and at an internal temperature of 300° C. the PA6 in the mixture was depolymerized over 2.5 h. The caprolactam formed was withdrawn overhead in gaseous form and then condensed at 74° C. The resulting caprolactam melt was cooled to obtain solid caprolactam. 290 g of caprolactam (90% based on PA6 content of starting mixture) were obtained. The product was analyzed by gas chromatography and had a purity of 90% by weight.

Examples 2 and 3 (Comparative Examples)

| Example | Starting material | Caprolactam purity [% by wt.] |
|---|---|---|
| 2 | Ultramid B36 | 97 |
| 3 | Ultramid B3WG6 (70% PA6) | 95-97 |

Example 2 was carried out analogously to the inventive example. Ultramid B36 was used instead of the 80:20 PA6/polyurethane block copolymer mixture.

Example 3

In a twin-screw compounding extruder 15 kg/h of a mixture of Ultramid B3WG6 and 2% KOH (Bernd Kraft, ultrapure potassium hydroxide pellets) based on the total amount (200 g of KOH per 10 kg of Ultramid B3WG6) were melted at 245° C. and supplied to a CKR 25 C twin-screw kneader reactor with discharge screw (LIST Technology AG, Switzerland). At a temperature of 271° C. and a vacuum of 35 mbar absolute the obtained polyamide 6 was depolymerized (residence time about 1 h). The caprolactam formed was withdrawn overhead in gaseous form and then condensed at 89° C. The resulting caprolactam melt was cooled to obtain solid caprolactam. The inert constituents, KOH and residual amounts of polyamide 6 were conveyed continuously via a discharge screw into a collecting vessel which was likewise under vacuum. 9.68 kg/h of caprolactam (94% based on the PA6 content of the starting mixture) were obtained. The product was analyzed by gas chromatography and had a purity of 95-97% by weight.

Example 4 (Inventive)

Depolymerization of a PA6 (Polyamide 6)/Polyurethane Block Copolymer Mixture in a Continuous Process:

In a twin-screw compounding extruder 13 kg/h of a mixture of a PA6/spandex mixture (80:20) and 2% KOH (Bernd Kraft, ultrapure potassium hydroxide pellets) based on the total amount (200 g of KOH per 10 kg of PA6/spandex) were melted at 245° C. and supplied to a CKR 25 C twin-screw kneader reactor with discharge screw (LIST Technology AG, Switzerland).

At a temperature of 300° C. and a vacuum of 60 mbar absolute the obtained polyamide 6 was depolymerized (residence time about 1 h). The caprolactam formed was withdrawn overhead in gaseous form and then condensed at 130° C. The resulting caprolactam melt was cooled to obtain solid caprolactam. The remaining constituents, KOH and residual amounts of polyamide 6 were conveyed continuously out of the kneader reactor via a discharge screw into a collecting vessel which was likewise under vacuum. 9.4 kg/h of caprolactam (94% based on the PA6 content of the starting mixture) were obtained. The product was analyzed by gas chromatography and had a purity of 87-88% by weight.

The invention claimed is:

1. A process for obtaining caprolactam from mixtures of caprolactam-containing polymers and polyurethane-containing polymers by depolymerization, wherein the depolymerization of the mixture is performed in the presence of 0.05% to 5% by weight of a base at a temperature of 250° C. to 350° C. and a pressure of 5 to 700 mbar and wherein the caprolactam is obtained in gaseous form.

2. The process according to claim 1, wherein the depolymerization of the mixture is performed in the presence of 0.05% to 3% by weight of a base.

3. The process according to claim 1, wherein the depolymerization is performed at a temperature of 270° C. to 350° C.

4. The process according to claim 1, wherein the depolymerization is performed at a pressure of 8 to 200 mbar.

5. The process according to claim 1, wherein the water content of the mixture during the depolymerization is not more than 5% by weight.

6. The process according to claim 1, wherein the base is a compound selected from the group consisting of alkali metal oxides, alkali metal hydroxides, and alkali metal carbonates.

7. The process according to claim 1, wherein the process is performed in a depolymerization reactor.

8. A process for obtaining caprolactam from a mixture of caprolactam-containing polymers with polyurethane-containing polymers by depolymerization, comprising the steps of:
   (A) heating the mixture to a temperature of 220° C. to 300° C. to obtain a melt(S),
   (B) adding a base before, during or after step (A),
   (C) charging the melt(S) into at least one depolymerization reactor,
   (D) heating the melt(S) to a temperature of 250° C. to 350° C. to obtain gaseous caprolactam,
   (E) discharging the gaseous caprolactam from the depolymerization reactor to leave behind a residue.

9. The process according to claim 8, wherein the water content of the mixture in step (C) is not more than 5% by weight.

10. The process according to claim 8, wherein the pressure in step (D) is 5 to 700 mbar.

* * * * *